Nov. 4, 1952   E. J. THURBER   2,616,534
FLUID POWER TRANSMISSION
Filed Dec. 16, 1946   4 Sheets-Sheet 1
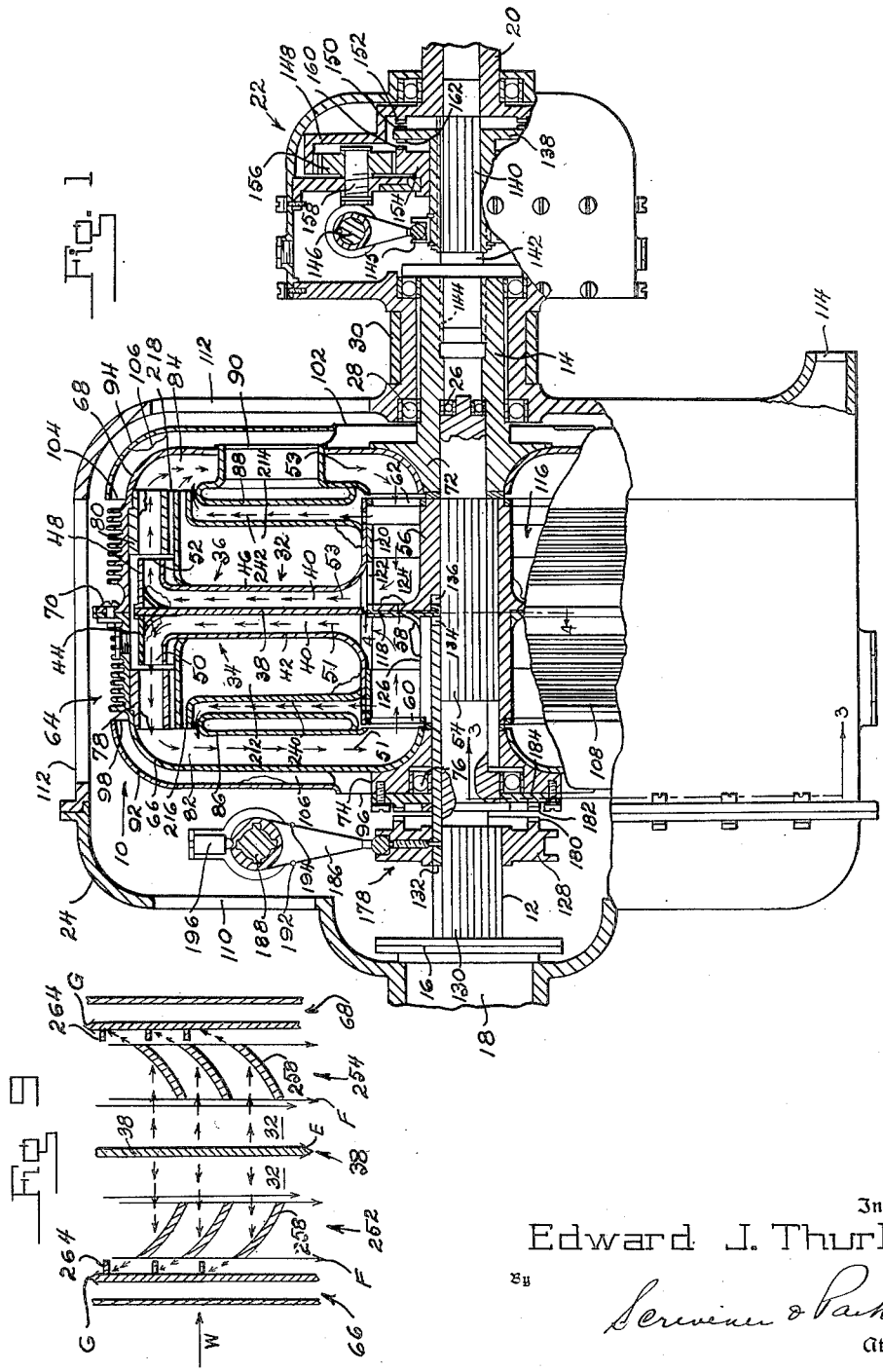
Inventor
Edward J. Thurber
By
Attorney Nov. 4, 1952  E. J. THURBER  2,616,534
FLUID POWER TRANSMISSION
Filed Dec. 16, 1946  4 Sheets-Sheet 2
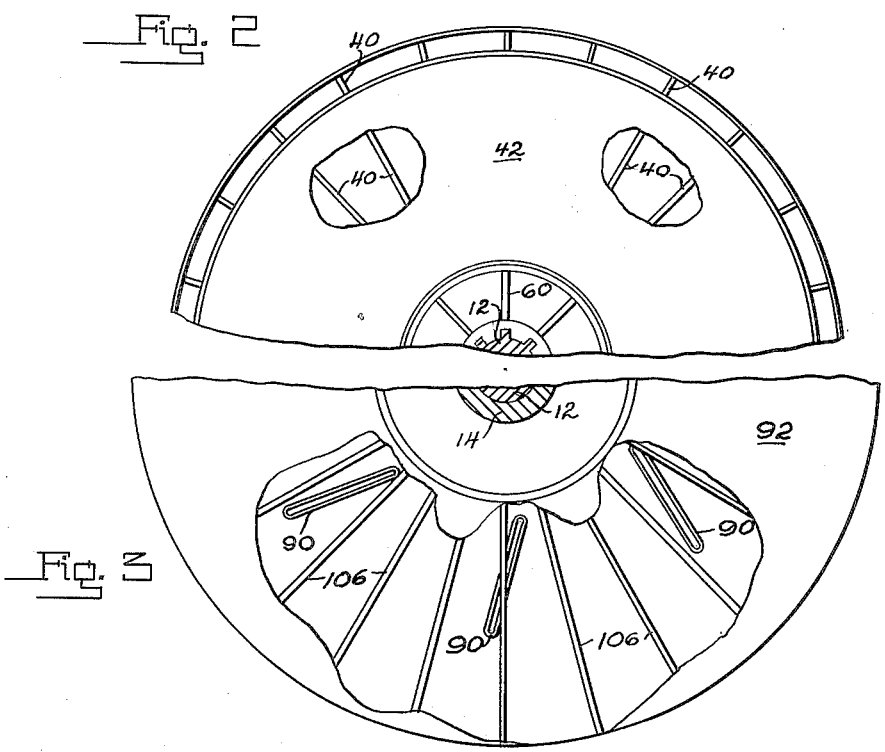
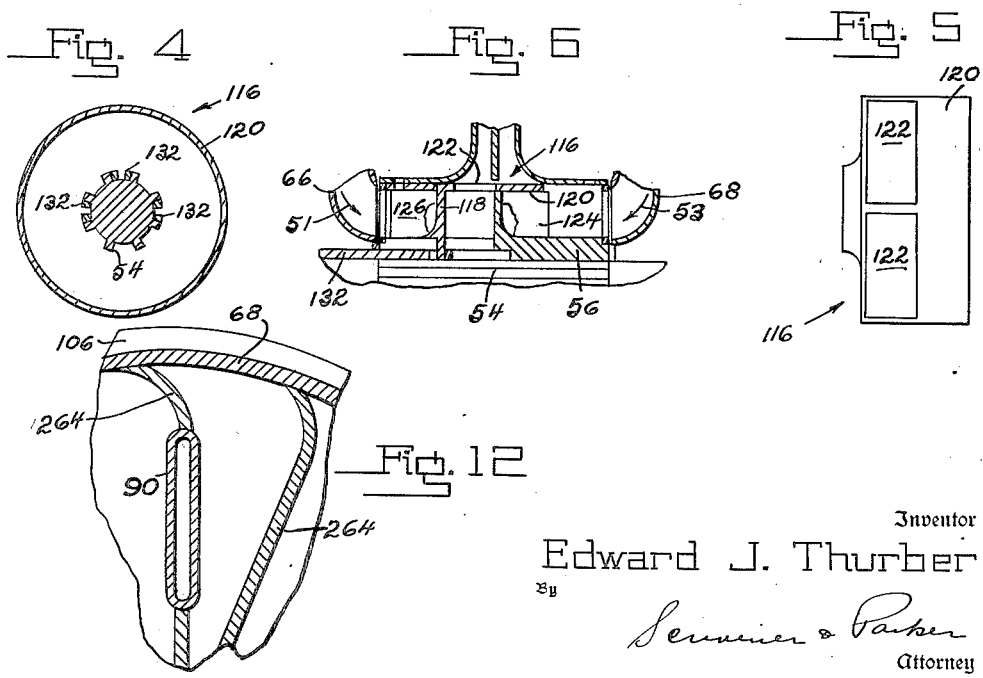
Inventor
Edward J. Thurber
By
Semmes & Parker
Attorney

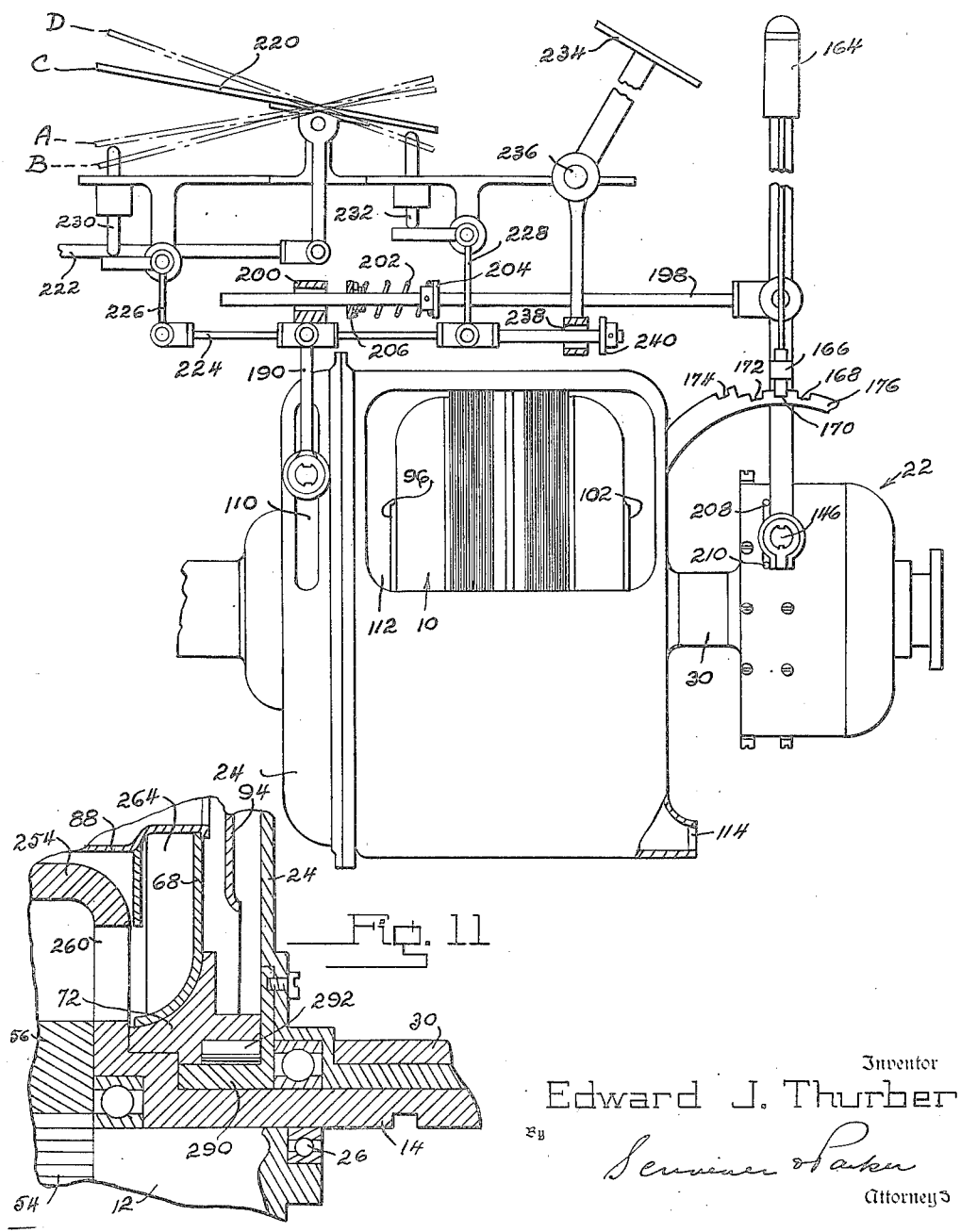

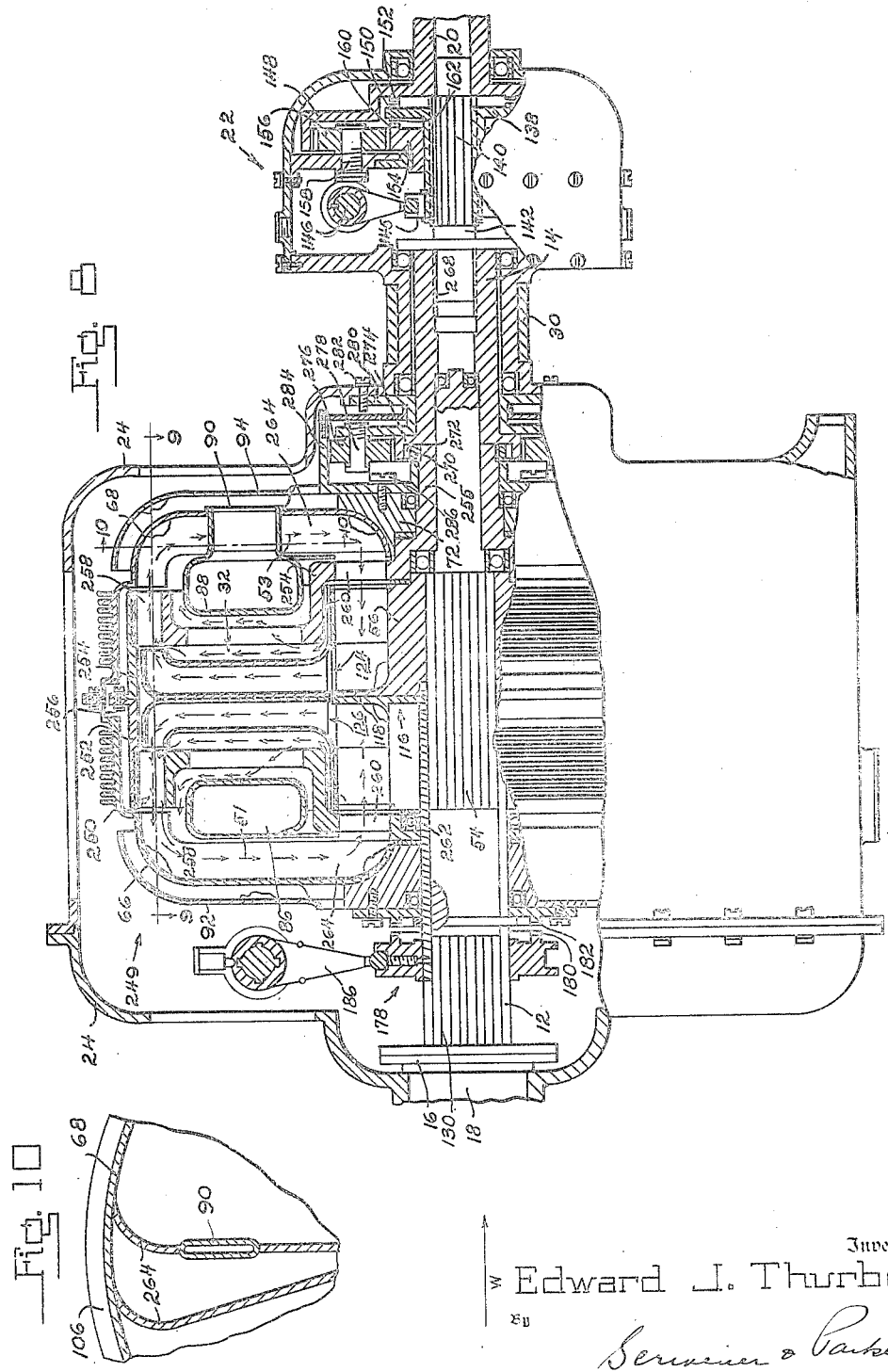

UNITED STATES PATENT OFFICE 2,616,534

FLUID POWER TRANSMISSION

Edward J. Thurber, New Orleans, La., assignor to The Thurber Corporation, New Orleans, La., a corporation of Louisiana Application December 16, 1946, Serial No. 716,505

49 Claims. (Cl. 192—.07)

This invention relates to hydraulic variable speed power transmission devices and more particularly to devices wherein the torque is multiplied and transmitted by means of rotary impeller and turbine members through the circulation and cooperative effect of a working fluid.

Hydraulic transmissions of the above types which have heretofore been proposed, have been so constructed and arranged as to cause the working fluid to traverse a toroidal path during operation, and the design and construction of the impellers, turbines, stationary reactionary vanes and other constituent parts has been such as to result in a decrease in efficiency of operation, especially when the impeller and turbine members are rotating at approximately the same speed. In addition to these difficulties, the prior art constructions have been such that a considerable amount of heat was generated during the operation, and in an effort to dissipate such heat, complicated and costly arrangements were proposed, which have not proved entirely satisfactory. Moreover, in prior transmissions of this type, reliance was placed upon the speed of the driving member for purposes of torque variation, and no arrangements were provided for disconnecting the driving and driven members except by the addition of costly and intricate clutches and shifting mechanisms therefor.

It is accordingly one of the objects of the present invention to provide a hydraulic power transmission mechanism of the rotary type which is constructed and arranged in such a manner as to avoid the disadvantages and objectionable features of the prior systems.

Another object is to provide a novel and improved hydraulic transmission device which combines the effective characteristics of a torque multiplying converter and those of a hydraulic coupling together with novel control mechanism therefor.

A further object resides in the provision of a controlling mechanism for a transmission of the above type which is effective to control the fluid working circuit in a novel manner.

Another object is to provide an arrangement which eliminates the necessity of providing extraneous clutch devices for connecting the impeller with the driving shaft and for disconnecting the driving and driven shafts.

Still another object comprehends a novel controlling mechanism which is especially advantageous in motor vehicle installations, and which provides a coordinated control, associated with one or more of the vehicle controlling members, for desirably influencing and varying the fluid working circuit of the transmission.

Another object includes the provision of a combined fluid transmission and gear transmission together with a novel control for establishing a direct drive between the driving and driven shafts to thereby eliminate the customary loss in slip of the hydraulic transmission, such arrangement also providing means for starting the vehicle engine by towing or pushing.

A further object is to provide in a transmission of the foregoing character, a novel controlling mechanism therefor which enables a rapid acceleration of the vehicle through a coordinated control of the fluid working circuit and the engine throttle control, the results achieved being similar to those secured by the kick-down units presently employed in connection with gear transmissions.

Still another object includes additional control mechanism for establishing a direct drive in parallel with the fluid transmission, and for automatically and simultaneously effecting an overdrive connection between the driving and driven shafts.

Another object is to provide an improved hydraulic transmission having guide vanes or reactionary members that are equally effective at all turbine speeds and fluid discharge angles.

Another object is to provide a novel and improved hydraulic transmission of the converter type having twin impellers and turbine members in a single casing, with the turbine member attached to the casing and receiving the fluid from the impeller flowing axially through the turbine members.

Another object resides in providing a hydraulic transmission of the converter type having a casing containing twin impellers and twin turbine members on each side of the impellers with each set of turbines arranged to rotate in opposite directions and all turbines connected to deliver their combined torque to a common driving member.

Another object is to provide a hydraulic transmission of the converter type having a casing containing twin impellers and turbines and twin fluid guide members at opposite ends of the casing, said fluid guide members extending from the inside periphery of the casing to its hub.

Another object of the invention is to provide for a motor vehicle, a hydraulic transmission of the converter type, having an air cooled system comprising a stationary casing containing a rotatable fluid unit, the rotatable fluid unit having means for circulating air around its sides, the stationary casing having an air intake opening and an air exhaust opening, movement of the vehicle causing fresh air to be drawn into the stationary casing for circulation therein and around said fluid unit and to be exhausted therefrom.

Still another object is to provide an improved transmission of the above character including a novel arrangement for preventing leakage of fluid, when the unit is at rest, together with a highly desirable and effective construction for cooling the fluid during operation of the transmission.

A further object resides in associating with the transmission, a novel control valve which is disposed within the transmission housing, and providing exterior connections operable by suitable vehicle controlling elements, for effectively shifting such valve in order to vary the operating characteristics of the transmission.

A still further object is to provide a transmission and control of the above type which includes relatively few parts, the construction and arrangement thereof being such that a compact and efficiently operable structure is achieved, and one which may be readily manufactured at a relatively low cost.

Other objects and novel features of the invention will appear more fully hereinafter from a consideration of the following detailed description when taken in connection with the accompanying drawings wherein several embodiments of the invention are illustrated. It is to be expressly understood, however, that the drawings are utilized for purposes of illustration only and are not to be taken as a definition of the limits of the invention, reference being had for this purpose to the appended claims.

In the drawings, wherein similar reference characters refer to similar parts throughout the several views:

Fig. 1 is a side view partly in section of a fluid transmission embodying the principles of the present invention;

Fig. 2 is a fragmentary front view of one of the impellers illustrating the vanes and the side plate thereof;

Fig. 3 is a fragmentary front view of the front cover of the transmission, taken substantially along line 3—3 of Fig. 1, and illustrating the cooling fins and outlet mouths of the annular cooling duct;

Fig. 4 is an axial sectional view of the control valve and driving shaft taken substantially along line 4—4 of Fig. 1;

Fig. 5 is a side view of the controlling valve;

Fig. 6 is a fragmentary side view in section, and illustrating the control valve in closed position;

Fig. 7 is a schematic side view of the transmission and controlling system therefor;

Fig. 8 is a side view partly in section of a slightly different form of fluid transmission;

Fig. 9 is a diagrammatic view illustrating in a developed plan, the cooperation between the working fluid and the transmission members, and taken substantially along line 9—9 of Fig. 8;

Fig. 10 is a fragmentary sectional view taken along line 10—10 of Fig. 8 and illustrate the vanes carried by the rotatable reactionary member;

Fig. 11 is a fragmentary sectional view of a modified form of the construction of Fig. 8, and Fig. 12 is a fragmentary sectional view of the reactionary vanes of the device of Fig. 11.

Referring more particularly to Fig. 1, one embodiment of the novel hydraulic power transmission constituting the present invention is illustrated therein as comprising a fluid transmitting unit 10 arranged to drivably connect driving and driven shafts 12 and 14 respectively, the driving shaft 12 being suitably connected with a flanged portion 16 of an engine crank shaft 18, while the driven shaft 14 is connected to a tail or propeller shaft 20 through a forward and reverse transmission 22. The unit 10 is preferably enclosed within a suitable housing 24, which may be, in the case of a motor vehicle installation, an extension of the engine crank case. As shown, the driving shaft 12 is projected through the central portion of the unit 10 and at its outer end, is rotatably supported by a pilot bearing 26 carried by the driven shaft 14. The latter shaft is suitably rotatably supported in the housing 24, as by means of bearings 28, while a stationary bracket 30 is employed for supporting the outer portion of the casing 24.

One of the novel features of the present invention resides in the construction of the fluid unit 10 which provides a twin-type of impeller and turbine unit arranged to derive maximum efficiency from the working fluid and to dissipate the heat generated therein in a novel and effective manner. More particularly, the unit 10 includes an impeller 32 having a front member 34 and a rear member 36, these being joined together at their periphery and to a central division plate 38, and each being provided with a series of spaced apart radially extending vanes 40, see Fig. 2. Referring to Fig. 1, it will be seen that the front impeller member 34 includes, in addition to the central plate 38, a side plate 42 and an annular head ring 44, while the rear impeller member 36 embodies a similar side plate 46 and a similar head ring 48. The vanes 40 of the respective impeller members are secured to the central plate 38 and to the side plates and head rings, as clearly shown in Fig. 1, the construction thus providing an outward radial flow of working fluid, followed by an axial flow to the respective exhaust outlets 50 and 52, the fluid paths constituting the working circuits being shown by the arrows 51 and 53.

In order to drivably connect the impeller 32 with the driving shaft 12, the latter is splined at 54 to receive the impeller hub 56 which is formed with a central annular plate 58 to divide the hub into front and rear intake manifolds. The front impeller member 34 is firmly secured to the hub 56 as by means of welding a manifold bridge ring 60 to the front portion of the hub and to the lower portion of the side plate 42. In like manner a rear bridge ring 62 is welded to the hub 56 and to the lower part of the side plate 46 in order to secure the rear impeller member 36 to the impeller hub. It will be understood that the bridge rings 60 and 62 are so constructed as to allow free flow of the fluid in the working circuits 51 and 53.

For the purpose of transmitting torque from the impeller members 34 and 36 to the driven shaft 14 through the fluid circulating in the paths 51 and 53, the present invention provides a novel turbine construction. As shown, such construction includes a turbine 64 of the twin type having a front cover 66 and a rear cover 68, these being provided with peripheral flanges secured together by a series of bolts 70. As shown, the rear cover 68 is welded or otherwise secured to a rear cone 72, integral or otherwise connected with the driven shaft 14, while the front cover 66 is suitably connected with a supporting front cone 74 which is rotatably mounted on the driving shaft 12 as by means of a bearing 76.

Front and rear bladed turbine rings 78 and 80 are respectively secured to the corresponding front and rear covers 66 and 68 and positioned to receive the working fluid issuing axially from exhaust outlets 50 and 52 and to direct the same axially to annular chambers 82 and 84, where, after traveling downwardly therein, as shown by the arrows, the fluid is directed back into the impeller in a manner which will appear more fully hereinafter.

Means are provided by the present invention for effectively dissipating heat generated in the working fluid during operation of the unit. As shown, such means includes internal cooling means comprising front and rear annular air cooling or ventilating ducts 86 and 88, each of which is provided with a plurality of spaced apart open mouths 90, as illustrated in Fig. 3. Preferably, these mouths are relatively narrow and are angularly arranged, as shown, in order to function as secondary turbine blades in a manner which will be more particularly described hereafter. In order to conduct cooling air to the ducts 86 and 88 through the mouths 90, the turbine 64 is provided with front and rear cover plates 92 and 94 respectively, the front cover plate 92 having an air intake opening 96 and an air exhaust opening 98, while the rear cover plate 94 is provided with like openings 102 and 104. Each cover plate carries a plurality of spaced apart radially arranged cooling fins 106, see Fig. 3, and exterior cooling fins 108 are provided to further increase the dissipation of heat.

In order to conduct cooling air from the exterior, and direct it to the cooling means just described, the stationary casing 24 is provided with one or more air inlet openings 110 and 112 preferably one in the top half and opening forwardly. An exhaust opening 114 is arranged at the bottom of the casing 24 to function in the manner of an ejector to create a forced circulation of air through the casing. For example, when the motor vehicle is in motion, it creates an air stream flowing around and past the air exhaust opening 114 and the movement of the air passing the air exhaust opening 114 will draw in cool air through the air intake openings 110—112 and exhaust it through the air exhaust opening 114. Thus a constant circulation of fresh air is supplied to the fluid unit 10 to be circulated around the casings by the rotation of the casing 66—68.

One of the important features of the invention resides in the provision of a novel arrangement for controlling the effectiveness of the fluid working circuits 51 and 53, and in the form illustrated, such arrangement includes a fluid control valve 116, Figs. 1 and 6, which forms a portion of the impeller manifold. More particularly, the valve 116 is of cup-shaped form and includes a forward vertically arranged plate 118 together with a cylindrical sleeve portion 120, the latter being provided with a plurality of openings 122 which, in the position shown in Fig. 1, permits the fluid in the circuit 53 to flow from rear inner impeller blades 124, secured to the hub 56, outwardly through the rear outer impeller blades 40. In like manner, the fluid in the working circuit 51 flows outwardly from the front inner impeller blades 126, which are secured to the plate 118, and through the front impeller blades 40. In the event, however, that the valve 116 is shifted from open position to the position shown in Fig. 6, it will be readily understood that the flow of fluid in the working circuits 51 and 53 is gradually diminished and finally arrested. This will be clear when it is seen that the circuit 53 is interrupted by the sleeve portion 120 while the plate 118 obstructs the flow in the circuit 51. With the fluid flow through the circuits 51 and 53 completely interrupted by closure of the valve 116, the transmission of torque from the impeller 32 to the turbine 64 is likewise interrupted and the driven shaft 14 is thus effectively disconnected from the driving shaft 12.

The above mentioned control of the fluid flow through operation of the valve 116 is secured by shifting a yoke 128 which is splined at 130 to the driving shaft 12, and connected to the valve 116 as by a plurality of arms 132. As will appear from Fig. 4, the arms 132 are positioned between certain of the splines 54 and the outer ends of the arms are connected with the plate 118 of the valve in such a manner as to allow a slight amount of lost motion at 134 and 136. Thus, a relatively simple but highly effective arrangement is provided for shifting the valve 116 from its open position, as shown in Fig. 1, to its closed position, as illustrated in Fig. 6.

As heretofore stated, a forward and reverse transmission 22 is provided for connecting the unit 10 to the tail shaft 20 in order to drive the vehicle forwardly or rearwardly. More particularly, such transmission comprises a forward and reverse clutch member 138 which is splined at 140 to a lay shaft 142, the latter being in turn splined at 144 to the driven shaft 14. A suitable yoke 145, adapted to be rocked in either direction by a cross shaft 146, is secured to the clutch 138 so that movement of the latter to the right is effective to establish forward drive through a ring gear 148 by reason of the engagement between clutch teeth 150 and 152. Reverse gear may readily be established by rocking the yoke in the opposite direction to drive the ring gear 148 in the opposite direction through a sun gear 154 and pinions 156, the latter being mounted to rotate about stationary shafts 158. In order to drive the sun gear 154, suitable clutch teeth 160 may be formed thereon for driving engagement with clutch teeth 162 carried by the clutch 138.

A novel arrangement is provided for readily controlling the operation of the transmission 22 and preferably such arrangement is so constituted as to enable the establishment of a direct drive between shafts 12 and 14, thereby shunting the fluid transmission 10 and eliminating the customary slip in hydraulic devices of this character. In order to achieve such desirable results, see Figs. 1 and 7, the cross shaft 146 is adapted to be operated by a control lever 164 which is preferably mounted on the vehicle steering column beneath the steering wheel so as to be readily accessible to the operator. The lever 164 is provided with a detent or latch 166 which is adapted to occupy suitable notches 168, 170, 172 or 174 on a segment 176 in order to maintain the lever in its various positions of adjustment.

In order to secure the direct drive between the shafts 12 and 14, as referred to above, a direct drive clutch 178, which may be of any suitable type, is formed by providing the yoke 128 with a plurality of clutch teeth 180 which are adapted to engage clutch teeth 182 formed on a clutch member 184 secured to the front cone 74. The clutch may be engaged by shifting a lever 186 secured to a cross shaft 188, the latter extending outside the casing 24 and having a lever arm 190 secured thereto, the arm 190 being actuated manually or by power derived from a suitable servomotor. Preferably, coil springs having end portions 192 and 194 are so arranged as to constantly urge the lever 186 in the neutral or valve open position shown in Fig. 1, and if desired, a spring pressed plunger 196 may be employed for latching the lever in such position. An operative connection between the lever 164 and the lever arm 190 includes a link 198 slidably mounted in a sleeve 200 carried by the lever arm 190, together with a spring 202 interposed between a collar 204, fixed to the link 198, and a washer 206 slidable on the link. In this manner, when lever 164 is moved to bring the latch 166 into the notch 174, the lever arm 190 is rocked in a counterclockwise direction to engage the direct drive clutch 178, the motion of the link 198 being imparted to the sleeve 200 through the resilient or spring loaded connection comprising spring 202 and washer 206. In order to allow movement of the lever 164 in the manner stated, the latter is connected to the cross shaft 146 through a spring loading coil having ends 208 and 210. Thus, after forward drive has been established by moving lever 164 to notch 172 to engage clutch teeth 150 and 152, the spring loading coil readily allows the lever to move to the notch 174 to engage the direct drive clutch 178.

Novel means are provided by the present invention for preventing the leakage of fluid from the unit 10 along the bearing and seals associated with the driving and driven shafts 12 and 14 respectively. As shown, such means include front and rear annular reservoirs 212 and 214 which are respectively carried by the front and rear impeller members 34 and 36. These reservoirs ae provided with respective annular openings 216 and 218 and the capacities thereof are such that when the impeller is at rest, a sufficient amount of the working fluid in the unit will flow into the reservoirs by way of openings 216 and 218 as to bring the level of the working fluid below the shafts 12 and 14. Thus, with the impeller stationary, leakage of fluid past the shaft bearings and seals is entirely eliminated.

In addition to the foregoing advantageous features of the present invention, a novel control system is provided which not only serves to coordinate the functioning of the direct drive clutch and the forward and reverse transmission, but also to correlate the operation of the fluid controlling valve 116 with other controls of the vehicle. More particularly, the control system includes operative connections between the valve 116 and the accelerator pedal 220, the latter being mounted for rocking movement as shown in Fig. 7 and being provided with a link 222 connected with the carburetor throttle arm, not shown. The connecting linkage between the throttle arm and pedal 220 may be of conventional form but should include a spring-loaded or other type of connection which will enable the pedal to move from the full throttle open position A to the position B. The construction is also such that the pedal may be moved from the normal idling position C to the position D.

It will be recalled that movement of the yoke 128 toward the left, as viewed in Fig. 1, serves to close the valve 116 and interrupt the flow of the working fluid in the circuits 51 and 53. In order to utilize the movement of the accelerator pedal 220 to control the operation of the valve 116, the lever arm 190 is connected with a horizontally extending link 224 which is connected at spaced points with levers 226 and 228. Lever 226 is associated with a plunger 230 operable by the front or toe portion of the pedal 220, while lever 228 is associated with a plunger 232 which may be operated by the rear or heel portion of the accelerator pedal. By reason of these connections, it will be readily understood that movement of the accelerator pedal 220 to either the positions D or B will serve to shift the link 224 to the right, rock the lever 190 in a clockwise direction and move the valve 116 toward closed position. Preferably the connections are such that with the pedal moved to position D, the valve 116 will be fully closed, while only partial closure of the valve will occur when the pedal is moved to position B. The novel control system also incorporates a master control pedal 234 which may be the vehicle brake pedal, which has a primary function of neutralizing the fluid unit 10, and a secondary function of applying the vehicle brakes. The pedal 234 in effecting its primary function may be rocked in a counterclockwise direction about its pivot 236 to shift the link 224 to the right and close the valve 116. This operation is achieved by extending the link 224 through an opening 238 in the lower end of the pedal and providing the end of the link with a stop 240. Thus even though the lever 164 has been operated to connect the direct drive clutch 178, such clutch may be disengaged and the valve 116 closed, by operating the master control pedal 234. Such operation serves to positively shift the link 224 to the right to move the lever 190 in a clockwise direction, the sleeve 200 compressing the spring 202 during the opening of the direct drive clutch and the closing of the valve 116.

From the above, it will be also understood that the control system provides a novel arrangement which is effective by movement of the accelerator pedal 220 beyond the throttle open position to disconnect the direct drive and re-establish a fluid drive between the driving and driven shafts. For example, and as above pointed out, the direct drive clutch 178 may be shifted to engage clutch teeth 180 and 182 through movement of the lever 164 to the notch 174. This movement shifts link 198 to the left and rocks the lever 190 in a counterclockwise direction. During this operation, the washer 206 engages the sleeve 200 and the spring 202 is compressed through the shifting of the link 198. With the direct drive clutch thus engaged, depression of the accelerator pedal 220 beyond the full throttle position to the position B will serve to shift the link 224 to the right and return the lever 190 to the position shown in Fig. 7. Thus the direct drive clutch 178 will be disengaged and a fluid drive will be re-established between the driving and driven shafts. It will be noted that during shifting of the link 224 to return the lever 190 to its normal position, the sleeve 200 will compress the spring 202 a further amount. The spring thus constitutes a power device which is effective to restore the direct drive connection by power, as soon as the accelerator pedal returns to a throttle operable position. During such movement of the pedal 220, the spring 202 serves to move the lever 190 in a counterclockwise direction and to shift the direct drive clutch to the right, Fig. 1, in order to re-engage the clutch teeth 180 and 182.

In operation, and assuming that the fluid unit 10 has been filled with sufficient fluid to constitute the working circuits 51 and 53 when the unit is in operation, it will be understood that a large portion of such fluid will be contained within the annular reservoirs 212 and 214 when the transmission is at rest. Hence, the level of the fluid outside of the reservoirs will be below the shafts 12 and 14, the shaft bearings and seals, so that no leakage of fluid from the unit 10 will occur when the unit is not rotating. When the impeller is rotated, all of the fluid will be expelled from the reservoirs 212, 214 into the working circuits.

With the parts occupying the neutral position shown in Figs. 1 and 7, it is only necessary to close the valve 116 by either operation of the master control pedal 234, or movement of the accelerator pedal 220 to position D, whereupon the vehicle engine is started in the usual manner. As soon as the engine has started, the lever 164 may be shifted to forward drive, it being recalled that the driving and driven shafts 12 and 14 respectively, are effectively disconnected by reason of the interruption of the fluid working circuits 51 and 53 due to the closure of valve 116. In this manner, the hydraulic transmission unit 10 functions as a disconnectible clutch between the driving and driven shafts. It will be understood that during movement of the lever 164 to the forward speed notch 172, forward speed will be established by reason of the engagement between clutch teeth 150 and 152 formed respectively on the clutch member 138 and the ring gear 148.

After forward speed has been established, it is only necessary to move the accelerator pedal 220 toward throttle opening position, and release the master pedal 234 in the event it had previously been operated to close the valve 116. As soon as these operations have been effected, the lever 186, through the action of the centering springs 192 and 194, will automatically assume the neutral position shown and the valve 116 will be shifted to open position in order to permit the establishment of the fluid working circuits 51 and 53.

It will be understood that with the valve 116 in open position to allow free passage of fluid in the two working circuits, the velocity of the fluid in such circuits will increase as the speed of the impeller 32 increases. When such velocity of the fluid is sufficient, the force of the fluid against the turbine blades 78 and 80 will cause the turbine 64 to rotate and thus impart rotation to the tail shaft 20 by way of the driven shaft 14, countershaft 142, clutch 138 and ring gear 148. After the fluid passes through the turbine blades 78 and 80, the fluid encounters the inclined ventilating mouths 90 which are so arranged as to function as secondary turbine blades to impart additional force to rotate the unit 10. Thereafter the fluid passes into the impeller manifold where it is picked up by the inner impeller hub blades 124 and 126 and again forced out to the outer impeller blades 40 of the front and rear impeller members 34 and 36.

During the circulation of the fluid in the working circuits as outlined above, the fluid is cooled by contact with the walls of the cooling ducts 86 and 88 while additional cooling is secured by the use of the cooling fins 106 and 108. A further fluid cooling means is provided by the auxiliary circuits shown by the arrows 240 and 242.

During the first phases of operation of the unit 10, the torque tranmitted will be increased, and this increase will gradually diminish and approximate a direct drive proportion. This will be readily understood when it is seen that when the impeller and the turbine are rotating at substantially the same speed, the fluid in the working circuits also rotates with the unit, at the same speed and in the same direction. Thus, there will be substantially no flow of fluid in the working circuits 51 and 53 and the operation of the unit will be similar to a hydraulic coupling transmission of power.

One of the more important features of the invention includes the provision for rapid acceleration of the vehicle under the control of the operator. This desirable feature is secured by moving the accelerator pedal 220 past the wide open throttle position A to the position B. This action causes a partial closure of the valve 116 through operation of the plunger 230, lever 226, link 224, lever arm 190 and lever 186, it being understood that the yoke 128 is thereby moved to the left, as viewed in Fig. 1. As the working circuits 51 and 53 are thus partially closed off by movement of the plate 118 and cylindrical portion 120 of the valve 116 to the left, it will be understood that the impeller load is slightly relieved, thereby allowing the vehicle engine to quickly accelerate. Acceleration of the engine will in turn accelerate the impeller 32 in order to greatly increase the velocity of the fluid in the working circuits and thereby establish an acceleration of the vehicle by reestablishing the fluid working circuits. As soon as the desired acceleration has been obtained, the accelerator pedal 220 may be returned to its normal operating range, whereupon the centering springs 192, 194 will return the lever 186 and parts connected therewith, to normal position with the valve 116 fully open. The functioning and operation of the fluid transmission unit in the manner just described is generally similar, insofar as the results obtained are concerned, to the action of kick-down units now in commercial use. That is, a rapid acceleration of the vehicle is obtained by merely tramping down on the accelerator pedal.

With the hydraulic unit operating as heretofore stated, it will be readily understood that a slight amount of slip will occur between the impeller and turbine. In the event that the operator should desire to eliminate this slip, as for example if the vehicle is being operated on a roadway with very great upgrade, it is only necessary to connect the direct drive clutch to by-pass or shunt the hydraulic unit 10 and fluid working circuits 51 and 53. This may be effected by merely moving the lever 164 until the latch 166 registers with the direct drive notch 174. Such movement of the lever, allowed by the springs 208 and 210 between the lever and the cross shaft 146, causes counterclockwise movement of the lever arm 190 through shifting of the link 198, and axial movement of the yoke 128 to the right, as viewed in Fig. 1. Axial movement of the yoke 128, permitted by the lost motion at 134 and 136 in part 132, causes engagement of the direct drive clutch 178 in order to transmit power directly from the driving shaft 12 to the driven shaft 14 by way of the engaged clutch 178, front cone 74, the turbine 64, and rear cone 72. In this manner, the hydraulic transmission unit is by-passed or shunted and the inherent slip therein is eliminated.

In the event that the vehicle is being operated in direct drive as above described, and the operator desires to quickly disconnect the driving and driven shafts, it will be perceived that such action may be readily effected by merely operating the master control pedal 234. During this operation, the lower end of the pedal moves the link 224 to the right, compressing the spring 202 and rocking the lever 186 to such a position that the direct drive clutch 178 is disengaged and the valve 116 is closed. As heretofore stated, this action interrupts the flow of fluid in the working circuits 51 and 53 and effectively disconnects the driving connection between the shafts 12 and 14 through the unit 10.

It will be also understood that with the vehicle operating in direct drive, an automatic shift to fluid drive may be secured by moving the accelerator pedal 220 beyond its throttle open position and to the position B. This action moves the plunger 230 downwardly and shifts the link 224 to the right through the bell crank 226. Upon movement of the lever 190 to the normal position illustrated in Fig. 7, the direct drive clutch 178 will be disengaged and the fluid drive will be re-established. At the same time, the spring power means 202 will be further compressed through movement of the sleeve 200. When the accelerator pedal is returned to its throttle operating range, the spring 202 will expand and move the lever 190 in a counterclockwise direction to again engage the clutch 178 and re-establish direct drive. Hence under these conditions, movements of the accelerator pedal 220 beyond the open throttle position serve to shift the device from direct drive to fluid drive and back to direct drive, the shift to direct drive being effected by power means in the form of the compressed spring 202.

A further form of the invention is disclosed in Fig. 8 which is similar in many respects to the embodiment of Fig. 1 and is designed to be controlled by the same control system disclosed in Fig. 7. The major differences between the two structures resides chiefly in the construction and method of operation of the hydraulic power transmitting units and to the fact that Fig. 8 includes an over-drive mechanism which is effective when the direct drive clutch is engaged. In addition, Fig. 8 incorporates twin impellers which cooperate with one set of twin turbine members positioned at one side of the impellers and with another set of twin turbine members positioned at the other side of the impellers. Means are also provided to connect all of the turbine members and to deliver their combined torque outputs to a common driving element.

More particularly, and referring to Fig. 8, the impeller 32 and controlling valve 116 of the power unit 249 are similar to the corresponding parts of Fig. 1. However, the twin primary turbine members 252, 254 are rotatably mounted with respect to the casing members 66, 68 while the latter carries vanes 264 and functions as a secondary turbine member rotating in the opposite direction to that of the primary turbine members 252, 254.

As shown, the turbine 250 comprises forward and rear turbine members 252 and 254, connected together at their periphery as by bolts 256 and each being provided with a series of primary blades 258 and a series of secondary blades 260. The forward turbine member 252 is suitably rotatably mounted on the driving shaft 12, as by means of a bearing 262, while the rear turbine member 254 is drivably connected in any convenient manner with a turbine shaft 255.

In order to derive additional energy from the working fluid traversing the working circuits 51 and 53 of Fig. 8, the casing parts 66 and 68 function as secondary turbine members and are provided with vanes 264 which are adapted to receive the fluid from the primary turbine members 252 and 254 and rotate the secondary turbine members 66, 68 in the opposite direction to that of the primary turbine members 252 and 254 and to discharge the fluid rotating in the direction of rotation of the twin impellers 32. Thus it is not required to have a stationary reactionary member to turn the fluid in the direction of rotation of the twin impellers 32.

A novel means is provided for drivably connecting the primary turbine members 252 and 254 and the secondary turbine members 66, 68 with the lay shaft 142 of the transmission 22, and such means is preferably so arranged as to derive driving torque from both the primary turbine and the secondary turbine members. As shown, such means includes an overrunning roller clutch connection between the turbine shaft 255 and the driven shaft 14 which is suitably splined at 266 to the lay shaft 142. More particularly, the turbine shaft 255, which is connected with the primary turbine members 252 and 254, is formed with an overrunning clutch driving cam 270 cooperating with one or more rollers 272, the latter in turn being associated with a sun gear 274 connected with the driven shaft 14. Sun gear 274 meshes with one or more pinions 276, which are mounted on stationary shafts 278 carried by a support 280 fixed to the casing 24 by screws 282, and the pinions 276 mesh with a ring gear 284. The latter is secured by screws 286 to the rear cone 72 and since the said cone is welded or otherwise attached to the casing member 68, it will be seen that the primary turbine members 252 and 254, which rotate in one direction, and the secondary turbine members 66, 68 which rotate in the opposite direction, are coordinated with the countershaft 142. It is desired to point out here, that the clutch cam 270 contacts the rollers 272 and imparts driving torque to the driven shaft 14 only when the twin primary turbine members 252 and 254 are rotating clockwise under the influence of fluid pressure.

Referring now to Fig. 9, a diagrammatic view of the twin impeller, twin primary turbine members and twin secondary turbine members is shown therein, in order to facilitate an understanding of the operation of the hydraulic unit 249. From this figure and viewed from the direction of arrow W, it will be seen that as the impeller 32 rotates in a clockwise direction, see arrows E, the working fluid will flow axially or laterally, at high velocity to strike primary turbine blades 258, which are curved or inclined to impart a clockwise rotation to the primary turbine members 252 and 254, as shown by the arrows F. Thereafter, the fluid exhausting from the primary turbine blades, flows in a path which is curved in a direction opposite to the direction of rotation of the turbine and strikes the secondary turbine vanes 264 carried by the rotatable casing 66, 68. The latter member hence rotates in a counterclockwise direction, as seen by the arrows G. As will appear from Fig. 10, the vanes 264 are suitably curved in order to derive maximum energy from the working fluid. Since the fluid will be discharged moving in the same direction of rotation as that of the twin impeller 32, it is not required that the secondary impeller vanes 264 be extended as far as the hub. From this construction it will be seen that as the fluid strikes the vanes 264 of the secondary turbine members 66 and 68, further torque transmission will be derived without abruptly changing the direction of the fluid, as would be the case if stationary reactionary vanes were employed. By dispensing with such abrupt change in the direction of flow of the working fluid, considerable heat and power losses are avoided. The fluid circuit just described is very effective for it permits the fluid to flow with a continuous working effort without being turned by a stationary reactionary member. For example, the fluid discharges from one element directly into the succeeding element and the fluid is always moving in the direction of rotation of the preceding element before entering therein and is finally discharged directly into the impeller with the fluid moving in the direction of rotation of the impeller.

In the operation of the device of Fig. 8, the initial operation of the control system of Fig. 7, as heretofore described in connection with Fig. 1, is precisely the same with respect to closing the valve 116 and placing the transmission 22 in forward drive. After the engine is started, and the valve 116 opened, the accelerator pedal 220 is operated in the same manner to increase the speed of the vehicle engine.

As the impeller 32 rotates in a clockwise direction, with the valve 116 open, it will be appreciated from the previous description, that the establishment of the fluid working circuits 51 and 53 will serve to rotate the primary twin turbine members 252 and 254 in a clockwise direction, while the secondary twin turbine members 66, 68 will rotate in a counterclockwise direction as indicated by arrow G in Fig. 9. With the secondary twin turbines or casings 66, 68 rotating counterclockwise the ring gear 284 attached thereto will impart a counterclockwise rotation to pinion 276 which will in turn impart a clockwise rotation to the sun gear 274 attached to the turbine driven sleeve 14. The primary twin turbine members 252, 254 which are rotating clockwise will also deliver their torque to the turbine driven sleeve 14 through the overrunning clutch 270, 272, 274. Thus, the combined torques of all the turbine members is delivered to a common driving element, namely, the turbine driven sleeve 14 and this element is rotated clockwise when viewed from the direction of arrow W, Fig. 8.

A forward and reverse turbine drive is provided. The driven sleeve 14 is connected by gearing in the transmission case 22 previously described, and provided for a forward drive when the clutch member 138 engages the ring gear clutch member 152. A reverse drive is obtained by connecting the shiftable clutch member 138 with the sun gear clutch member 160. A positive neutral position is obtained when the shiftable clutch member 138 is not connected to any other clutch member.

In addition to the above, a mechanical drive is provided for connecting the driving shaft 12 with the propeller shaft 20. By rotating the lever 186 in a counterclockwise direction, the clutch member 178, splined at 130 to the driving shaft 12, will be moved to the right to engage the clutch teeth 180 with the clutch teeth 182 fixed to the casing members 66, 68, thus connecting the casing to the driving shaft 12 to be rotated clockwise therewith. With the casing 66, 68 connected to the driving shaft 12, the power flow will be as follows: driving shaft 12 to casing 66, 68, to ring gear 284 rotating clockwise, to pinion 276 rotating clockwise and to sun gear 274 rotating counterclockwise. Thus, the driven shaft 14, the lay shaft 142 and the shiftable clutch member 138 will all be rotating counterclockwise. When the shiftable clutch member 138 is shifted to the left its teeth 162 will engage the sun gear teeth 160 rotating the sun gear 154 in a counterclockwise direction which will impart a clockwise rotation to the ring gear 148 and propeller shaft 20. It is pointed out here that when the primary turbine members 252, 254 are free from the influence of the circulating fluid that the over-running clutch 270, 272, 274 will release the primary turbine members for free rotation independent of the secondary turbine members 264 and the casing 66, 68.

An overdrive may be provided by changing the direction of rotation of the impeller and primary turbine members from clockwise to counterclockwise. For example, with the driving shaft 12 and the casings 66, 68 connected by clutch 178 to rotate together, the ring gear 284 will also rotate counterclockwise, rotating the pinion 276 counterclockwise and imparting a clockwise rotation to the sun gear 274, the turbine driven sleeve 14, lay-shaft 142 and shiftable clutch member 138. Since the ring gear 284 fixed to the casing is larger in diameter than the sun gear 272 it and all members attached to the sun gear 272 will be rotated faster than the ring gear 284. Thus, an overdrive can be delivered to propeller shaft 20. In Fig. 8 the method of operating the ring valve 116 is the same as previously described in connection with Figs. 1 and 7.

Referring now to Figs. 11 and 12, a variation of the form of the invention of Fig. 8 is shown therein, wherein the twin impeller and the twin primary turbine are arranged to rotate in a clockwise direction, while the reactionary vanes 264 attached to the casing member 68 are arranged so that counterclockwise rotation thereof is prevented, while clockwise rotation thereof is allowed.

More particularly, and referring to Fig. 11, together with Fig. 8, the twin turbine members 252 and 254 are rotatable relative to the casings 66, 68 and are formed integrally with or are suitably connected to the driven shaft 14 which is splined to the countershaft 142 as in Figs. 1 and 8. Fixed to the stationary casing 24 is an overruning clutch cam ring 290, which is adapted to cooperate with a plurality of clutch rollers 292. The reactionary member 68 is secured to the rear cone support 72 which in turn, cooperates with the clutch rollers 292, the construction being such that the overrunning clutch 290, 292 prevents the member 68 from rotating counterclockwise, when the vanes 264 thereof are subjected to fluid reaction, while allowing clockwise rotation of the reaction member 66 when the vanes 264 are freed from the fluid pressure reaction.

In addition to the foregoing, it will be understood that the primary vanes 258 of the respective turbine members 252 and 254 are so inclined as to cause clockwise rotation of the turbine in response to circulation of the working fluid in the circuits 51 and 53. Thus while the impeller and turbine rotate in a clockwise direction, the exhaust of fluid from the turbine vanes 258 will be in a counterclockwise direction and the fluid, in striking the reactionary vanes 264, will impose a counterclockwise thrust on the reaction members 66, 68. However, due to the use of the overrunning clutch 290, 292, the reaction member may not move in a counterclockwise direction, and hence the fluid reaction of the working circuits 51 and 53 will be taken by reaction vanes which are stationary.

In operation, as soon as the impeller and turbine of Fig. 11, are rotating at approximately the same speed, the exhaust from the turbine members 252 and 254 will finally cease to exert a thrust against the reactionary vanes 264. In this condition, the reactionary members or casings 66, 68 will be freed, by the overrunning clutch 290, 292 and can follow the rotating impeller and turbine parts in a clockwise direction. Thus, the unit will function as a fluid coupling. Attention is directed to the position and shape of the reactionary vanes 264. They are positioned and attached to the inside of the casing members 66, 68 and extend from the top of the casing to its hub. Thus they are located in a large area and not confined to the hub area as in conventional converters. Also, being attached to the side of the casing the vanes 264 guide the fluid to an area where it can best be cooled.

It is recognized that the fluid discharging from a turbine member will vary its angle of discharge at different turbine speeds. However, the shape of the reactionary vanes 264 is such that they will accommodate this variation in angular discharge of the fluid. For example, see Fig. 9, which will illustrate the following: Part of the reactionary vanes 264 extend axially inward and part of the vanes extend at substantial right angles to the axially inward extended part. Since the fluid is exhausted axially from the primary turbine members 252, 254 it is obvious that the shape of the reactionary vanes 264 is such that they will accommodate the change in the angular discharge of the fluid from the turbine members.

While the controls of Fig. 7 are intended to be used with the form of Figs. 11 and 12, it is desired to point out that when the clutch 178 is engaged, the reactionary members 66, 68 is caused to rotate in a clockwise direction at driving shaft speed. Hence, the operator may pick up and rotate the reactionary member at will. With the reactionary members 66, 68 rotating, the vanes 264 will force the fluid radially outward balancing the radially outward flow of the fluid from the impeller 32 and thus, the fluid circulation will be stopped. However, a direct mechanical connection between the driving and driven shafts may not be obtained, since the casing or reaction members 66, 68 is never connected to the driven shaft 14. Aside from this action, the control system including the valve 116 of Figs. 1 and 8 operate in the same manner as in said figures.

The present invention thus provides a variety of novel hydraulic transmission devices together with a simplified and highly advantageous system of controls. For example, the use of the controlling valve for interrupting the fluid working circuits enables the driving and driven members to be effectively disconnected, thus eliminating the necessity of extraneous and costly clutch mechanisms. Partial closing of the valve under the control of the accelerator pedal enables a rapid acceleration of the vehicle to be obtained in a relatively simple manner. A further advantage of the control system proposed, resides in the incorporation of the direct drive clutch operated by the lever 164 which may conveniently be mounted on the steering column within easy reach of the operator. Several different and desirable results are achieved, in the various forms of the invention, by closing this clutch, as for example, the direct drive of Fig. 1, the overdrive of Fig. 8 and the casing rotation of Fig. 11. In all forms however, the master control 234 is so coordinated in the system as to readily effect disengagement of the clutch and partial or total closure of the valve 116 to control the operation of the fluid transmissions.

Additional advantages are derived from the various types of fluid transmissions disclosed herein. For example, in conventional torque converters, when the turbine and impeller speeds approach each other, stationary reaction members tend to block the fluid circuit, thereby resulting in a decrease in the multiplication and transmission of torque. This is caused primarily by the change in the angle of discharge of the fluid from the turbine as the latter gains speed. For example, during initial starting, the angular discharge from the turbine may be as high as 45 degrees, which may drop to 20 degrees or less as the speed of the turbine increases. Conventional stationary reactionary vanes heretofore utilized and positioned in the hub area do not compensate for these changes and thus the natural result of the prior constructions is the blocking of the fluid circuit as the speed of the turbine increases.

In the present invention however, and referring to Figs. 8, 9, 10 and 12, the fluid is discharged axially of the turbine and regardless of the change in the angle of discharge, the simple guide vane structure 264 will operate at maximum efficiency and at no time will it block the fluid working circuits. While the descriptions thus far have been directed to twin impellers and turbines it is obvious that an effective unit can be produced by using only half of the impellers and turbines. That is, a single impeller and turbine of Fig. 1 and Fig. 2 or a single impeller with double rotating turbine members as Fig. 8, may be advantageously utilized.

While several forms of the invention have been disclosed herein and described with considerable particularity, it will be readily understood by those skilled in the art, that various changes and modifications thereof may be resorted to without departing from the spirit of the invention. Reference will therefore be had to the appended claims for a definition of the limits of the invention.

What is claimed is:

1. A controlling mechanism for a motor vehicle of the type having a throttle controlled engine, a driving shaft, a driven shaft, a single hydraulic power transmitting unit connecting said shafts, and a throttle controlling element, said unit including a rotatable casing together with means to circulate fluid therein, valve means in said casing and rotatable therewith and movable to vary the torque transmitting characteristics of said power transmitting unit, means to mount said element for movement in a throttle controlling range and in a separate transmitting unit controlling range outside the throttle controlling range, and means to control said valve means by said element only when the latter is moved in said transmitting unit controlling range.

2. A controlling mechanism for a motor vehicle of the type having a throttle controlled engine, a driving shaft, a driven shaft, and a throttle controlling element, means to mount said element for movement in one direction in a first range to move the throttle to full open position and for movement in a second range in said one direction beyond the full open position, a hydraulic power transmission including a closed fluid circuit for transmitting torque from the driving to the driven shaft, valve means movable in said circuit to variably restrict the flow of fluid in said circuit and thereby vary the transmission of torque from the driving shaft to the driven shaft, and means controlled by movement of said element in said second range beyond the full open position of the throttle for controlling said valve means.

3. A controlling mechanism for a motor vehicle of the type having a throttle controlled engine, a driving shaft, a driven shaft, and a throttle controlling element, means to mount said element for movement in one direction in a first range to move the throttle to full open position and for movement in a second range in said one direction beyond the full open position, a hydraulic power transmission including rotatable impeller and turbine members and a closed fluid circuit therebetween for transmitting torque from the driving shaft to the driven shaft, valve means carried by the impeller and movable to variably restrict the flow of fluid in said circuit to thereby vary the transmission of torque from the driving shaft to the driven shaft, and means controlled by movement of said element in said second range beyond the full open position of the throttle for controlling said valve means.

4. A controlling mechanism for a motor vehicle of the type having a throttle controlled engine, a driving shaft, a driven shaft, and a throttle controlling element, means to mount said element for movement in one direction in a first range to move the throttle to full open position and for movement in a second range in said one direction beyond the full open position, a hydraulic power transmission including rotatable impeller and turbine members and a closed fluid circuit therebetween for transmitting torque from the driving shaft to the driven shaft, valve means carried by the impeller and surrounding the driving shaft and movable to variably restrict the flow of fluid in said circuit to thereby vary the transmission of torque from the driving shaft to the driven shaft, and means controlled by movement of said element in said second range beyond the full open position of the throttle for controlling said valve means.

5. A controlling mechanism of the character set forth in claim 3 wherein the valve means is carried by the impeller hub and is movable to completely arrest flow of fluid in said circuit.

6. A power transmitting system for a motor vehicle having a throttle controlled engine and a throttle controlling element movable in opposite directions to open and close the throttle, means to mount said element for movement in one direction in a first range to move the throttle to full open position and for movement in a second range in said one direction beyond the full open position, a driving member, a driven member, a hydraulic torque transmitting device for establishing a fluid drive between said members including a closed fluid working circuit interposed between said members, said device having an impeller connected with the driving member and a turbine connected with the driven member, valve means for variably restricting the flow of fluid in said working circuit, and means for mechanically coupling the driving and driven shafts to thus shunt said hydraulic device, and means operable by movement of said element in said second range beyond the full open position of the throttle to disconnect the mechanical coupling and re-establish said fluid drive.

7. A power transmitting system for a motor vehicle having a throttle controlled engine and a throttle controlling element movable in opposite directions to open and close the throttle, means to mount said element for movement in one direction in a first range to move the throttle to full open position and for movement in a second range in said one direction beyond the full open position, a driving member, a driven member, a hydraulic torque transmitting device for establishing a fluid drive between said members including a closed fluid working circuit interposed between said members, said device having an impeller connected with the driving member and a turbine connected with the driven member, valve means for variably restricting the flow of fluid in said working circuit, means for mechanically coupling the driving and driven shafts to thus shunt the hydraulic device, and common means for operating said valve means and said mechanical coupling means, and means operable by movement of said element in said second range beyond the full open position of the throttle to disconnect the mechanical coupling and operate said valve means.

8. A power transmitting system as set forth in claim 7 wherein the valve means is carried by the hub of the impeller.

9. A power transmitting system comprising a driving shaft, a driven shaft, and an output shaft, a hydraulic torque transmitting device interposed between said driving and driven shafts and including a closed fluid working circuit, said device having an impeller connected with the driving shaft and a turbine connected with the driven shaft, means operable to mechanically connect the driving and driven shafts to thus shunt the hydraulic device, a forward and reverse gear transmission interposed between the driven and output shafts, a control member for operating the transmission to secure forward speed, and means connecting said member and mechanical connecting means to operate the latter while maintaining said forward speed.

10. A power transmitting system comprising a driving shaft, a driven shaft, and an output shaft, a hydraulic torque transmitting device interposed between said driving and driven shafts and including a closed fluid working circuit, said device having an impeller connected with the driving shaft and a turbine connected with the driven shaft, means operable to mechanically connect the driving and driven shafts to thus shunt the hydraulic device, valve means for variably restricting the flow of fluid in said working circuit, a gear transmission interconnected between the driven and output shafts for establishing forward and reverse speeds of the output shaft, a control member for the transmission, means connecting the control member and mechanical connecting means to operate the transmission for forward speed and to thereafter operate said connecting means to mechanically connect the driving and driven shafts, and a separate control member movable to disconnect said connecting means and to thereafter operate said valve means to restrict said fluid flow.

11. A power transmitting device comprising a driving member, a driven member, a fluid torque transmitting device including a casing connected with the driven member, turbine blades carried by the casing, an impeller connected with the driving member and arranged to set up a fluid working circuit with said turbine blades to hydraulically transmit torque from the driving shaft to the driven shaft upon rotation of the driving shaft, a valve associated with the impeller for variably restricting the fluid flow in said circuit, and means to connect the casing with the driving member.

12. A fluid transmission comprising a vaned casing, rotatable impelled and turbine members within the casing for establishing a circulation of working fluid in a closed path for transmitting torque from one of the members to another, means for rotating the vaned casing in one direction and the turbine in the opposite direction for transmitting said torque, and gearing connecting said vaned casing and said turbine to compound their torques and to deliver the compounded torques to a common output member.

13. A fluid transmission comprising a driving shaft and a driven shaft, a rotatable fluid transmission connecting said shafts including an impeller connected with the driving shaft, a rotatable casing for working fluid and a turbine, means for connecting the casing and the turbine to the driven shaft to deliver torque thereto, means to at will connect the casing with the driving shaft to shunt the fluid transmission, and means including gearing to drive the driven shaft at an overdrive ratio when the casing is connected with the driving shaft.

14. A fluid transmission as defined in claim 13 wherein the casing rotates in one direction and the turbine rotates in the opposite direction.

15. A fluid transmission comprising a driving shaft and a driven shaft, a rotatable fluid transmission connecting said shafts including an impeller connected with the driving shaft, a rotatable casing for working fluid, and a primary turbine, said casing having vanes and constituting a secondary turbine, vanes on said impeller, casing and primary turbine arranged to cooperate with the working fluid so that the primary turbine is rotated in one direction and the secondary turbine is rotated in the opposite direction, and gear means connecting the primary turbine and secondary turbine to compound the torques delivered thereby and deliver such compounded torques to the driven shaft.

16. A fluid transmission as defined in claim 15 which includes in addition, means operable to variably restrict the flow of working fluid in the casing.

17. A fluid transmission as set forth in claim 15 which comprises in addition, means to drivably connect the casing with the driving member to rotate the casing and impeller in the same direction.

18. A fluid transmission comprising a rotatable bladed impeller, a rotatable bladed turbine, a rotatable casing provided with reactionary vanes, said casing containing a supply of working fluid, means to rotate the impeller to set up a working fluid circuit interlinking the impeller, turbine and reactionary vanes to transmit and multiply torques by rotating the impeller in one direction and the casing in the opposite direction, a driven member, and means including an overrunning clutch for connecting the casing and turbine to the driven member.

19. A fluid transmission comprising a rotatable bladed impeller, a rotatable bladed turbine, a rotatable casing provided with reactionary vanes, said casing containing a supply of working fluid, means to rotate the impeller to set up a working fluid circuit interlinking the impeller, turbine and reactionary vanes to transmit and multiply torques by rotating the impeller in one direction and the casing in the opposite direction, a driven member, and means for directly connecting the impeller and casing to drive the latter and the turbine in the same direction, and drive the driven member at an overdrive ratio.

20. A fluid transmission comprising a driving shaft and a driven shaft, a rotatable fluid transmission connecting said shafts including an impeller connected to the driving shaft, a turbine, and a casing for working fluid, means including an over-running clutch for transmitting torque from the turbine to the driven shaft, said clutch automatically disconnecting the turbine from the driven shaft when the turbine is free of fluid pressure from the impeller, and means for at will mechanically connecting the driving and driven shafts.

21. A controlling mechanism for a motor vehicle of the type having a throttle controlled engine, a throttle controlling element movable in one direction to open the throttle and movable in another direction to close the throttle, means to mount said element for movement in one direction in a first range to move the throttle to full open position and for movement in a second range in said one direction beyond the full open position, a driving shaft, and a driven shaft, a hydraulic power transmission unit for operatively connecting said driving and driven shafts including a casing containing fluid, an impeller connected to said driving shaft for circulating the fluid, and a turbine member positioned in the path of the circulating fluid and connected to the driven shaft, and means operable by said throttle controlling element when moved in said second range beyond the full open throttle position to partially restrict the circulation of fluid in said casing.

22. A controlling mechanism for a motor vehicle of the type having a throttle controlled engine, a throttle controlling element movable in a throttle operating range to open and close the throttle and movable also beyond the full open throttle position in a controlling range, a driving shaft, a driven shaft, a hydraulic power transmission unit for operatively connecting said driving and driven shafts including a casing containing fluid, an impeller connected to said driving shaft for circulating the fluid, and a turbine member positioned in the path of the circulating fluid and connected to the driven shaft, means for varying the torque transmitting characteristics of said power transmission unit, and means to control said varying means by said element only when the latter is moved in said controlling range.

23. A controlling mechanism as set forth in claim 22, wherein said varying means includes a valve movable by said element upon movement of the latter in said controlling range, to restrict the circulation of fluid in said casing.

24. A controlling mechanism for a motor vehicle of the type having a throttle controlled engine, a throttle controlling element movable in one direction to open the throttle and movable in another direction to close the throttle, a driving shaft, and a driven shaft, a hydraulic power transmission unit for operatively connecting said driving and driven shafts to establish a hydraulic driving connection therebetween, said unit including a casing containing fluid, an impeller connected to said driving shaft for circulating the fluid, and a turbine member positioned in the path of the circulating fluid and connected to the driven shaft, means for directly connecting said driving and driven shafts to establish a direct drive therebetween, and means operable by movement of said throttle controlling element beyond the throttle open position to disconnect the direct drive between the driving and driven shafts and to establish the hydraulic driving connection between said shafts.

25. A controlling mechanism for a motor vehicle of the type having a throttle controlled engine, a throttle controlling element movable in one direction to open the throttle and movable in another direction to close the throttle, a driving shaft, and a driven shaft, a hydraulic power transmission unit for operatively connecting said driving and driven shafts to establish a hydraulic driving connection therebetween, said unit including a casing containing fluid, an impeller connected to said driving shaft for circulating the fluid, and a turbine member positioned in the path of the circulating fluid and connected to the driven shaft, means for directly connecting said driving and driven shafts to establish a direct drive therebetween, means operable by movement of said throttle controlling element beyond the throttle open position to disconnect the direct drive between the driving and driven shafts and to establish the hydraulic driving connection between said shafts, and means including a power device for re-establishing the direct drive and disestablishing the hydraulic driving connection between said shafts.

26. A controlling mechanism for a motor vehicle of the type having a throttle controlled engine, a throttle controlling element movable in one direction to open the throttle and movable in another direction to close the throttle, a driving shaft, and a driven shaft, a hydraulic power transmission unit for operatively connecting said driving and driven shafts to establish a hydraulic driving connection therebetween, said unit including a casing containing fluid, an impeller connected to said driving shaft for circulating the fluid, and a turbine member positioned in the path of the circulating fluid and connected to the driven shaft, means including a clutch for connecting said driving and driven shafts to establish a direct drive therebetween, and means operable by movement of said throttle controlling element beyond the throttle open position to disconnect said clutch to interrupt the direct drive between the driving and driven shafts and to establish the hydraulic driving connection between said shafts.

27. A controlling mechanism for a motor vehicle of the type having a throttle controlled engine, a throttle controlling element movable in one direction to open the throttle and movable in another direction to close the throttle, a driving shaft, and a driven shaft, a hydraulic power transmission unit for operatively connecting said driving and driven shafts to establish a hydraulic driving connection therebetween, said unit including a casing containing fluid, an impeller connected to said driving shaft for circulating the fluid, and a turbine member positioned in the path of the circulating fluid and connected to the driven shaft, means including a clutch for connecting said driving and driven shafts to establish a direct drive therebetween, means operable by movement of said throttle controlling element beyond the throttle open position to disconnect said clutch to interrupt the direct drive between the driving and driven shafts and to establish the hydraulic driving connection between said shafts, and means including a power device for reconnecting said clutch to re-establish the direct drive and for disestablishing the hydraulic driving connection between said shafts.

28. A fluid power transmission comprising driving and driven shafts, a hydraulic torque transmitting device comprising a casing having a working fluid therein, twin impeller members connected with the driving shaft to circulate the fluid in a pair of separate closed paths, twin primary turbine members having parts in both of said paths for rotation by the fluid therein, twin secondary turbine members having parts in both of said paths for rotation by the fluid therein, a driven element and means for connecting all of said turbine members to combine the torques delivered thereby and to deliver the combined torques to said driven element.

29. A fluid power transmission as set forth in claim 28 wherein the twin primary turbine members rotate in one direction and the twin secondary turbine members rotate in the opposite direction.

30. A fluid power transmission as set forth in claim 28 wherein the fluid circulating in said paths through the twin impeller members, the twin primary turbine members and the twin secondary turbine members is discharged directly into each succeeding member with the fluid moving in the same direction as the direction of rotation of said succeeding member, and the fluid is finally discharged from the twin secondary turbine members, directly into the twin impeller members with the fluid moving in the same direction as the direction of rotation of the twin impeller members.

31. A fluid power transmission as set forth in claim 28 wherein the fluid in said paths is discharged axially from the twin impeller members directly into the parts of the twin primary turbine members and flows axially therethrough and is discharged therefrom moving in a direction opposite to the direction of rotation of said twin primary turbine members, the fluid being discharged directly into the parts of the secondary turbine members to rotate them in a direction opposite to that of the primary turbine members, the fluid moving radially inward through the secondary turbine members and being discharged therefrom directly into the twin impeller members and with the fluid moving in the same direction as the direction of rotation of the twin impeller members.

32. A fluid power transmission as set forth in claim 28 which comprises in addition, means operable at will to connect the driven element and driven shaft to establish a forward or reverse fluid drive, and other means operable at will to mechanically connect the driving and driven shafts and thus shunt the fluid drive.

33. A fluid power transmission as set forth in claim 28 which comprises in addition, means operable at will to mechanically connect the driving and driven shafts and drive the driven member at an overdrive ratio.

34. A fluid power transmission as set forth in claim 28 wherein one of said twin turbine members rotates relative to the casing, and the other of said twin turbine members is fixed to said casing.

35. A fluid power transmission as set forth in claim 28 wherein one of said twin turbine members is releasable from said driven element.

36. A fluid power transmission comprising driving and driven shafts, a hydraulic torque transmitting device comprising a casing having a working fluid therein, an impeller member connected with the driving shaft to circulate the fluid in a closed path, a primary turbine member and a secondary turbine member in the path of the circulating fluid and rotated thereby, said turbine members rotating in opposite directions, a driven element, and means for connecting said turbine members to combine the torques delivered thereby and to deliver the combined torques to said driven element.

37. A fluid power transmission as set forth in claim 36 wherein one of said turbine members rotates relative to the casing, and the other turbine member is fixed to the casing.

38. A fluid power transmission as set forth in claim 36 wherein one of said turbine members is releasable from said driven element for free rotation.

39. A fluid power transmission as set forth in claim 36 wherein the fluid in said path is discharged axially from the impeller member directly into the primary turbine member and flows axially therethrough and is discharged therefrom moving in a direction opposite to the direction of rotation of said primary turbine member, the fluid being discharged directly into the secondary turbine member to rotate the latter in a direction opposite to that of the primary turbine member, the fluid moving radially inward through the secondary turbine member and being discharged therefrom directly into the impeller member and with the fluid moving in the same direction as the direction of rotation of the impeller member.

40. A fluid power transmission as set forth in claim 36 wherein the fluid circulating in said path through the impeller, primary turbine and secondary turbine members is discharged directly into each succeeding member with the fluid moving in the same direction of rotation of said succeeding member, and the fluid is finally discharged from the secondary turbine member directly into the impeller member with the fluid moving in the same direction as the direction of rotation of the impeller member.

41. A fluid power transmission as set forth in claim 36 which comprises in addition, means operable at will to connect the driven element and driven shaft to establish a forward or reverse fluid drive, and other means operable at will to mechanically connect the driving and driven shafts and thus shunt the fluid drive.

42. A fluid power transmission as set forth in claim 36 which comprises in addition, means operable at will to mechanically connect the driving and driven shafts and drive the driven member at an overdrive ratio.

43. A fluid power transmission comprising driving and driven shafts, a hydraulic torque transmitting device comprising a casing having a working fluid therein, an impeller member connected with the driving shaft to circulate the fluid in a closed path, a turbine member connected with the driven shaft and positioned in the path of the circulating fluid to be rotated thereby to transmit torque from the driving shaft to the driven shaft, said impeller extending radially substantially to the inner periphery of the casing and including a part for directing the fluid axially into the turbine member, the latter member having a vaned part for conducting the fluid axially therethrough and a normally stationary reactionary member adjacent the impeller and turbine members extending from the inner periphery of the casing to its hub portion, said reactionary member having vanes provided with portions extending axially inward and provided with other portions positioned at a substantial angle from the axially extending portions, said other positions being curved to direct the fluid exhausting from the turbine member to flow in the same direction as the impeller, and means for connecting the casing directly with the driving shaft for rotation thereby to arrest circulation of fluid in said path.

44. A fluid power transmission for a motor vehicle provided with braking means to stop the vehicle from movement, comprising driving and driven shafts, a hydraulic torque transmitting device comprising a casing having a working fluid therein, an impeller member connected with the driving shaft to circulate the fluid in a closed path, a turbine member connected with the driven shaft and positioned in the path of the circulating fluid to be rotated thereby to transmit torque from the driving shaft to the driven shaft, valve means operable to restrict the circulation of fluid and to arrest the transmission of torque between said shafts, and a manually operable controlling element connected to said valve means and to said braking means and operable to operate said valve means to arrest the transmission of torque between said shafts and to apply said braking means.

45. A fluid power transmission mechanism comprising a stationary casing, a rotatable casing mounted in the stationary casing, impeller and turbine members in the rotatable casing cooperating with a working fluid therein for setting up a fluid working circuit in a closed path for the transmission of torque, said rotatable casing being provided with ventilating vanes on the exterior thereof, a cover plate cooperating with said vanes to form a ventilating passage around the exterior of the rotatable casing, said cover plate having a hub providing an air inlet opening and also having an exhaust opening at its periphery, and means for rotating said rotatable casing to cause cooling air to be circulated through the inlet opening, around the exterior of the rotatable casing through the ventilating passage and exhausted at said exhaust opening to provide a continuous circulation of cooling air, said stationary casing having an inlet for drawing in fresh cool air to be circulated around said rotatable casing and an air outlet for withdrawing heated air from within the stationary casing.

46. A fluid power transmission mechanism as set forth in claim 45 which includes in addition, a plurality of ventilating passages positioned within the rotatable casing, and means for connecting said last named ventilating passages with the ventilating passage formed by said vanes and cover plate.

47. A fluid power transmission mechanism for an automotive vehicle comprising a stationary casing provided with an air inlet and an air outlet, said stationary casing having a rotatable casing mounted therein, impeller and turbine members in the rotatable casing cooperating with a working fluid therein for setting up a fluid working circuit in a closed path for the transmission of torque, said rotatable casing being provided with ventilating vanes on the exterior thereof, a cover plate cooperating with said vanes to form a ventilating passage around the exterior of the rotatable casing, said cover plate having a hub providing an air inlet opening and also having an exhaust opening at its periphery, the inlet of the stationary casing being directed forwardly of the vehicle and the outlet of the stationary casing being directed rearwardly of the vehicle so that forward movement of the vehicle creates an air stream flowing past the outlet to draw cooling air through the inlet to cool the rotatable casing and be exhausted through the outlet, and means for rotating said rotatable casing to cause cooling air to be circulated through the inlet opening around the exterior of the rotatable casing through the ventilating passage and exhausted at said exhaust opening.

48. A fluid power transmission mechanism as set forth in claim 47 which includes in addition, a plurality of cooling fins on the periphery of said rotatable casing.

49. A fluid power transmission mechanism as set forth in claim 47 wherein the cover plate is fixed to the rotatable casing for rotation therewith.

EDWARD J. THURBER.

REFERENCES CITED

The following references are of record in the file of this patent:

UNITED STATES PATENTS

| Number | Name | Date |
|---|---|---|
| 1,199,360 | Fottinger | Sept. 26, 1916 |
| 1,203,265 | Radcliffe | Oct. 31, 1916 |
| 1,298,990 | Mason | Apr. 1, 1919 |
| 1,830,156 | Zahn | Nov. 3, 1931 |
| 1,863,128 | Salerni | June 14, 1932 |
| 1,914,289 | Pomeroy et al. | June 13, 1933 |
| 1,993,741 | Jandasek | Mar. 12, 1935 |
| 2,004,279 | Fottinger | June 11, 1935 |
| 2,014,944 | Martyrer et al. | Sept. 17, 1935 |
| 2,015,300 | Dell et al. | Sept. 24, 1935 |
| 2,073,357 | Wemp | Mar. 9, 1937 |
| 2,089,590 | Walti | Aug. 10, 1937 |
| 2,104,608 | Cox et al. | Jan. 4, 1938 |
| 2,116,461 | Fottinger | May 3, 1938 |
| 2,120,896 | Koeppen et al. | June 14, 1938 |
| 2,137,139 | Keller | Nov. 15, 1938 |
| 2,145,005 | Fichtner | Jan. 24, 1939 |
| 2,205,054 | Wemp | June 18, 1940 |
| 2,205,794 | Jandasek | June 25, 1940 |
| 2,212,901 | Schneider | Aug. 27, 1940 |
| 2,226,801 | Black | Dec. 31, 1940 |
| 2,251,972 | Banner | Aug. 12, 1941 |
| 2,340,494 | Smirl | Feb. 1, 1944 |
| 2,341,921 | Jandasek | Feb. 15, 1944 |
| 2,346,606 | Putt | Apr. 11, 1944 |
| 2,372,748 | Swift | Apr. 3, 1945 |
| 2,379,015 | Lysholm | June 26, 1945 |
| 2,392,520 | Benz et al. | Jan. 8, 1946 |
| 2,417,964 | Becker | Mar. 25, 1947 |
| 2,457,692 | La Brie | Dec. 28, 1948 |
| 2,465,739 | McGill | Mar. 29, 1949 |